(12) United States Patent
Withers (10) Patent No.: US 8,637,129 B2
(45) Date of Patent: Jan. 28, 2014

(54) BAG MADE FROM EXTRUDED FLEXIBLE POLYMERIC SHEET MATERIAL

(75) Inventor: Philip Withers, Southbank (AU)

(73) Assignee: Intellectual Property Development Corporation Pty Ltd., Melbourne, Victoria (AU)

( * ) Notice: Subject to any disclaimer, the term of this patent is extended or adjusted under 35 U.S.C. 154(b) by 942 days.

(21) Appl. No.: 11/813,855

(22) PCT Filed: Jan. 10, 2006

(86) PCT No.: PCT/AU2006/000024
§ 371 (c)(1),
(2), (4) Date: Apr. 24, 2008

(87) PCT Pub. No.: WO2006/074507
PCT Pub. Date: Jul. 20, 2006

(65) Prior Publication Data
US 2008/0199643 A1    Aug. 21, 2008

(30) Foreign Application Priority Data

Jan. 14, 2005  (AU) ................................ 2005900178

(51) Int. Cl.
*B32B 1/02* (2006.01)

(52) U.S. Cl.
USPC ....... 428/35.7; 428/34.4; 428/35.2; 428/36.4; 428/36.6

(58) Field of Classification Search
USPC ........... 428/34.1, 34.2, 34.3, 34.4, 34.8, 34.9, 428/35.1, 35.2, 35.4, 35.5, 35.7, 36.4, 36.6, 428/36.7, 36.8, 36.9, 36.91, 36.92, 105, 428/107, 109–112, 114, 196, 212, 213, 217, 428/218

See application file for complete search history.

(56) References Cited

U.S. PATENT DOCUMENTS

| | | | |
|---|---|---|---|
| 3,368,740 A | | 2/1968 | Rhode |
| 4,252,851 A | | 2/1981 | Lansbury et al. |
| 4,716,068 A | | 12/1987 | Seifried et al. |
| 4,874,129 A | * | 10/1989 | DiSapio et al. ................. 239/36 |
| 5,382,472 A | * | 1/1995 | Yanidis et al. ................. 428/349 |
| 5,714,225 A | * | 2/1998 | Hansen et al. ................. 428/114 |
| 5,882,749 A | * | 3/1999 | Jones et al. ................. 428/35.2 |
| 5,955,181 A | | 9/1999 | Peiffer et al. |
| 6,103,161 A | | 8/2000 | Lopez |
| 6,156,252 A | | 12/2000 | Freedmen |
| 6,344,515 B1 | | 2/2002 | Parikh et al. |
| 6,394,651 B2 | | 5/2002 | Jackson |
| 6,394,652 B2 | | 5/2002 | Meyer et al. |

(Continued)

FOREIGN PATENT DOCUMENTS

| | | |
|---|---|---|
| DE | 19806452 A | 8/1999 |
| EP | 191550 A | 1/1985 |
| EP | 189986 A | 8/1986 |
| EP | 937405 A | 8/1999 |
| FR | 1 550 848 A | 12/1968 |
| WO | WO 94/17980 A | 8/1994 |

(Continued)

OTHER PUBLICATIONS

Supplementary European Search Report dated Sep. 2, 2010.

*Primary Examiner* — Walter B Aughenbaugh
(74) *Attorney, Agent, or Firm* — K&L Gates LLP (57) ABSTRACT

A sheet material including a plurality of bands of polymeric material extruded parallel to each other in a single layer film, wherein adjacent bands of polymeric material include odor control additives that are different from one another. The sheet material may be formed into a bag.

6 Claims, 4 Drawing Sheets

(56) References Cited

U.S. PATENT DOCUMENTS

| | | | |
|---|---|---|---|
| 6,562,478 B1 | 5/2003 | Fischer et al. | |
| 7,117,631 B2 * | 10/2006 | Peters | 43/81 |
| 2003/0170479 A1 | 9/2003 | Peiffer et al. | |
| 2005/0227844 A1 | 10/2005 | Malaspina | |

FOREIGN PATENT DOCUMENTS

| | | |
|---|---|---|
| WO | WO 99/37475 A | 7/1999 |
| WO | WO 00/08622 A | 2/2000 |
| WO | WO 2004/060241 A1 | 7/2004 |
| WO | WO 2005/012405 A | 2/2005 |

* cited by examiner

BAG MADE FROM EXTRUDED FLEXIBLE POLYMERIC SHEET MATERIAL

FIELD OF THE INVENTION

The present invention relates generally to flexible polymeric sheet material, such as mono- and multi-layer film, that is extruded, and to products such as bags made therefrom. The invention is particularly concerned with such sheet material and products having portions that perform different functions or have different physical properties.

BACKGROUND

It has previously been proposed to provide portions of flexible polymeric sheet material with different functions or physical properties. For example, in U.S. Pat. Nos. 6,394,651 and 6,394,652 it has been proposed to emboss such sheet material in different ways in order to give different portions of the sheet material different stretch properties.

It has also been proposed to treat portions of the surface of flexible polymeric sheet material in different ways in order to provide those portions with different functions or physical properties. In one proposal, US 2005/0227844 discloses a vacuum packaging bag in which at least one wall has hot-printed rough stripes on its inner surface, which are substantially rectilinear and extend longitudinally, preferably over the full length of the bag. The purpose of the rough stripes is to prevent sticking or adherence between parts of the bag and therefore to readily permit extraction of air from the bag during vacuum packaging.

In another proposal for surface treating portions of flexible polymeric sheet material to provide different functions or physical properties, WO 2004/060241 discloses striped material that is formed by depositing particles in stripes on a polymeric substrate. The striped material is described as particularly suitable for use in disposable absorbent articles such as napkins and diapers, and it is suggested that the particles may provide absorbency, odour-control, fluid modification, or various other functions or physical properties in response to substances that contact the striped material.

In all of the aforementioned proposals, the substrate flexible polymeric sheet material is the same throughout its extent, and the different functions or physical properties in different portions of the sheet material are provided by post-treating the substrate material.

Striped bags of two different colours are also known. Such bags are welded from extruded flexible polymeric sheet material formed from the same substrate composition but with alternating pigments in adjacent co-extruded bands to provide merely a visual difference between the stripes.

It would be advantageous to be able to provide a greater range of different functions or physical properties in different portions of extruded flexible polymeric sheet material and/or to provide different functions or physical properties in different portions of extruded flexible polymeric sheet material without having to post-treat the substrate sheet material. In some embodiments, it would also be advantageous to be able to provide modified functions or physical properties in extruded flexible polymeric sheet material, and products made therefrom, without having to use relatively expensive polymeric materials or additives throughout the sheet material. This may facilitate the use of relatively expensive components of the sheet material in price sensitive products such as disposable plastic bags.

SUMMARY OF THE INVENTION

According to the present invention there is provided extruded flexible polymeric sheet material comprising plural co-extruded bands of material, wherein adjacent co-extruded bands have different material compositions to provide said adjacent bands with different physical properties or functions in the sheet material.

Further according to the present invention, there is provided a product comprising extruded flexible polymeric sheet material as described in the immediately preceding paragraph. In one embodiment, such a product is a flexible bag welded or otherwise formed from the sheet material. Particular examples of such a bag include a waste, garbage or rubbish bag, a storage bag, a garden refuse bag, a food or other packaging bag and a sanitary disposal bag.

It will be appreciated that for the purposes of the present invention colour alone is not considered as a function or physical property. However, different colours may be used in the adjacent co-extruded bands in addition to the different material compositions that provide the adjacent bands with different functions or physical properties in the sheet material.

The extruded flexible polymeric sheet material may be mono-layered or multi-layered. If multi-layered, the plural co-extruded bands may be in each layer, only one layer or in some but not all of the layers. In a preferred embodiment, the extruded flexible polymeric sheet material is a mono-layer film.

Polymeric materials suitable for use in the extruded flexible polymeric sheet material include all of those known as suitable for extruding polymeric sheet material, particularly thermoplastic films, whether in different layers of a multi-layer film, in different bands of the same layer or of a mono-layer film, as blends, as co-polymers or in any other known and compatible arrangement. Specific examples include polyethylene, polypropylene, polyamine, polycarbonate, acid co-polymers, ionomers, polyvinyl alcohol, ethylene vinyl alcohol, polystyrene, polyamide, corn starch resin, polyvinyldene chloride, polyester, and polybutylene, as well as such elastomers as elastomeric styrene polymers including styrene-butadiene-styrene, styrene-isoprene-styrene, styrene-ethylene/butylene-styrene and styrene-ethylene/propylene-styrene (these and other elastomeric polymers are available, for example, under the Kraton trademark), ethylene acrylate co-polymers such as ethylene-methyl acrylate and ethylene-ethyl acrylate, and ethylene-vinyl acetate.

If two or more of the above polymeric materials are used in adjacent bands of the sheet material in order to provide at least one different function or physical property, they must be sufficiently compatible to be co-extruded into the sheet material. The different polymeric materials may provide the different bands with, for example, different strength properties, stretch properties, solubilities, puncture resistance, tear resistance, or sealing properties. Other differing physical properties or functions provided by bands of different co-extruded polymeric materials may be readily envisaged.

In the case of extruded flexible polymeric sheet material that is to be formed into a garbage bag, the preferred polymeric material is polyethylene, most preferably high density polyethylene (HDPE) or a blend including HDPE, for example HDPE and LLDPE . The proportion of LLDPE (linear low density polyethylene) in the blend may be varied in adjacent bands of the co-extruded material to provide different functions or physical properties. For example, increased proportions of LLDPE increase the stretchability of the material.

Another polyethylene blend is LDPE/LLDPE. Providing different blends of LDPE/LLDPE in adjacent co-extruded bands of the flexible sheet material will alter the functions or physical properties of the bands, from a low Dart Impact (puncture resistance) and low stretch stretchability for a LDPE rich blend to a high Dart Impact and high stretchability for a LLDPE rich blend.

In another example of extruded flexible polymeric sheet material comprising plural co-extruded bands of different polymeric materials, adjacent co-extruded bands are of, respectively, polyethylene and a Kraton polymer or ethylene methylacrylate (EMA). Such a sheet material may be formed into a garbage bag, in which the polyethylene band(s) provide the typical polyethylene bag properties, while the Kraton polymer or EMA band(s) provide one or more stretchable zones to allow the bag to expand. Each of the polymeric materials (or only one of them) may contain the same or different additives to provide additional physical properties or functions.

It will be appreciated that different adjacent co-extruded bands of at least substantially the same polymeric material may comprise from 100:0 to 0:100, or any different range in between, of virgin and recycled material, and that in some circumstances the different ratios may provide the different physical properties or functions in the different bands. By way of example only, compared to virgin material, recycle polymeric material may have less strength, a greater thickness, at least in parts, as a result of reduced meltability of the recycle material in the extruder, and greater opacity.

Where additives are included in one or more of the co-extruded bands to provide one or more different physical properties or functions in the sheet material, the bands may comprise the same or different base polymeric material, as described above.

Different physical properties or functions that can be achieved by additives include odour control, including odour neutralising and/or fragrancing, antiseptic and/or disinfectant properties including by the use of anti-microbial and/or anti-bacterial agents, strength, opacity/transparency, surface properties including slip coefficient of friction and surface roughness, solubility, and degradation including biodegradation.

Odour neutralising can work by masking, superimposing, blocking, suppression, absorption, adsorption or the like. Suitable additives for inclusion in the polymeric sheet material for the purposes of odour neutralising include caustic soda, baking soda (bicarbonate soda), amines, thiols, sulphides, short chain aliphatic and olefinic acids, aldehydes, esters, and the like. Additionally, some selective combinations of fragrances can provide odour neutralisation.

Odour fragrancing can be provided by natural fragrances or aroma chemicals. The particular type of fragrance is not directly relevant to the invention. However, by way of explanation, natural fragrances may be obtained from flowers, leaves, woods, peels and other vegetable matter by, for example, steam distillation (eg. lavender oil, rose oil and patchouli oil), solvent extraction (eg. jasmine and oak moss) and cold pressing (eg. lemon oil and orange oil). Aroma chemicals are obtained by chemical reactions from petroleum and coal by-products and are available in a range of odours.

Both natural fragrances and aroma chemicals are available encapsulated into plastic pellets, with the level of fragrance in the pellet and the dosage of pellets in the polymeric sheet material determining the fragrance level in the sheet material. One example of such pellets is Polyiff fragrance pellets manufactured by International Flavors and Fragrances (IFF) of the USA.

One example of an anti-bacterial/anti-microbial composition suitable for inclusion in the polymeric sheet material is the product Triclosan, a diphenyl ether (bis-phenyl) derivative known as either 2,4,4'-trichloro-2'-hydroxy diphenyl ether or 5-chloro-2-(2,4-dichlorophenoxy) phenol and marketed under the trade names Irgaguard, Irgason and Irgacare by Ciba Specialty Chemical Products. Another example is the Vanquish anti-microbial product from Avecia Limited, in which the active ingredient is n-butyl-1,2-benzisothiazolin-3-one.

Examples of degradation enhancers and/or biodegradation improvers are corn starch and Total Degradable Plastics Additives (TDPA) available from EPI in Canada. TDPA products counter the effect of stabilisers in the polymeric sheet material, allowing accelerated oxidation and degradation.

The soluble polymer polyvinyl alcohol may also be considered as a degradation enhancing additive.

$CaCO_3$ and other fillers may be included in the polymeric material compositions to introduce surface roughness and/or to increase the thickness or thickness feel of the sheet material.

The specific additives identified above are given by way of example only, and many other possible additives will be recognised as providing a variety of functions or physical properties in the polymeric sheet material.

The present invention has the substantial advantage of permitting the incorporation of two or more different additives into the polymeric sheet material which might not otherwise be possible or acceptable, for example because the additives react together or are otherwise incompatible. For example, mixing bicarbonate soda as an odour neutraliser and a volatile fragrance oil such as lemon oil together in polymeric sheet material can cause a reaction at elevated temperature with the release of carbon dioxide, causing weakness in the sheet material. By using the two components in respective co-extruded bands of the sheet material, they can be kept apart to avoid such a reaction.

Similarly, mixing two or more oil-based fragrances with the intention of producing a harmonious blend can have the opposite result. One such example is a mixture or lavender oil and eucalyptus oil. By the present invention, the two oils may be incorporated into the polymeric sheet material in respective co-extruded bands, thereby avoiding a reaction between the two and achieving the desired harmonious result.

Fragrance products are available that can block the smell of specific malodour molecules and provide a selected fragrance. One example is Veilex, a perfume ingredient in some IFF products. However, there is only a very limited range of fragrancing ingredients which also have an odour neutralising capability. The present invention readily permits the use of both odour neutralisers and fragrances in the same polymeric sheet material without risk of the two or more additives reacting adversely.

The invention also readily permits the use of reduced amounts of one or more additives. Thus, by including a standard concentration of a particular additive in one of the co-extruded bands of the sheet material and none or a lesser amount in an adjacent co-extruded band, the same advantages may be available as if the additive had been included at the standard concentration throughout the polymeric sheet material, but at a reduced volume of additive and, therefore, expense. The same advantage may not be achievable by merely reducing the concentration throughout the polymeric sheet material since the reduced concentration may not produce the desired effect. For the purposes of clarification, reducing or increasing the concentration of a single additive or combination of additives of the material composition in one co-extruded band of the sheet material relative to the material composition of an adjacent co-extruded band may provide the adjacent bands with different physical properties or functions in accordance with the invention even at very low levels of concentration difference. The particular level will depend upon the additive(s). Generally, to achieve the most advantage from the invention, the particular additive or combination of additives that provides the desired function or physical property will be present at the required level in one of the bands and not at all in the adjacent band(s).

The additives may be provided in any suitable form as is known in the prior art. For example, they may be gaseous, liquid or solid or a combination such as a solid containing gas or liquid. Apart from the aforementioned pellets, solid additives may be in the form of powder, flakes, silvers, needles or the like. The additives may be soluble or insoluble in the polymer of the sheet material.

There may be any number of co-extruded bands within the polymeric sheet material, from two upwards. The bands will extend longitudinally in the extrusion direction of the polymeric sheet material, but they may extend longitudinally, transversely or obliquely in a product, such as a bag, made from the sheet material. The number of different sets of bands, where each set has a different material composition providing at least one different function or physical property to the other set(s), is a function of the number of different extruders that are used.

The width of the adjacent bands may be the same or different. Where the adjacent bands are of different colours, by virtue of different pigments having been added to the different material compositions of the bands, there may be advantage in the adjacent bands being of different width if it is desired to visually mask any bleeding effect of the different colours into each other at a junction of the two bands.

Most conveniently, the bands are of constant width throughout their length, but this is not essential. However, varying the width of the bands along the length does add considerable complexity to the extrusion die.

The array of two or more co-extruded bands may extend across all or only part of the width of the extruded flexible polymeric sheet material and/or throughout any product made therefrom. In effect, any single elongate portion of the polymeric sheet material that does not contain an additive and/or is of the base polymeric material may be considered as a band, no matter what its width is compared to any other band or bands. It is advantageous for the portion of extruded flexible polymeric sheet material that is formed into the integral handles of a bag to not contain any additives, or at least to not contain any additives that may have a detrimental effect on the skin of a person gripping the handles.

Preferably, the plural co-extruded bands of material extend throughout the length of the polymeric sheet material, but this is not essential. Technology is known for stopping the supply of particular streams of molten polymer to an extrusion die. The bands, or some of them, could therefore be intermittent along the length of the sheet material. The same effect may be apparent in any product made from the sheet material, although not necessarily in the length direction of the product.

The flexible polymeric sheet material of the invention is made by extruding the bands of different material compositions from respective extruders through a common die and allowing the adjacent co-extruded bands of molten material to melt merge into each in the die. The extruded sheet material may be uni-axially or bi-axially oriented by stretching the material as appropriate. In a preferred embodiment the sheet material is extruded as a tube, which may be blown in known manner to provide at least part of the orientation. The tubular form may be maintained or the tube may be slit along its length, depending upon the product or products to be formed from it.

BRIEF DESCRIPTION OF THE DRAWINGS

The present invention will now be described by way of example only with reference to the accompanying drawings in which.

Figure 1:
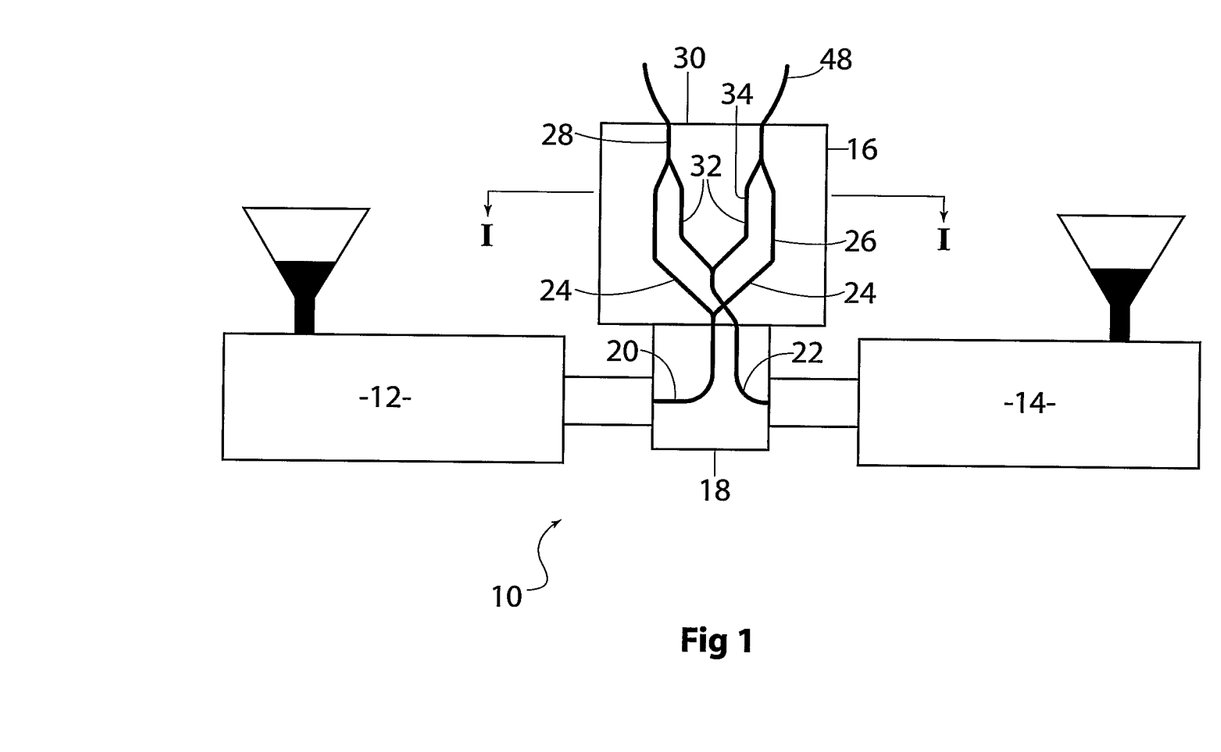
FIG. 1 is a schematic view of one form of co-extrusion apparatus useful for forming extruded flexible polymeric sheet material in accordance with the invention.

Referring to FIG. 1, the co-extrusion apparatus 10 comprises a first extruder 12 and a second extruder 14. The two extruders 12 and 14 co-extrude respective polymer melts having different material compositions into a common die assembly 16 via an intermediate transfer subassembly 18. The transfer subassembly 18 has a melt flow path 20 from the first extruder 12 and a melt flow path 22 from the second extruder 14, both leading to the die assembly 16.

In the die assembly 16, the melt flow path 20 is subdivided into plural pathways 24 which extend on an outer flow path annulus 26 towards a die outlet 28 at the downstream end 30 of the die assembly 16.

Similarly, the melt flow path 22 subdivides in the die assembly 16 into plural pathways 32 which extend on an inner flow path annulus 34 towards the die outlet 28.

Figure 2:
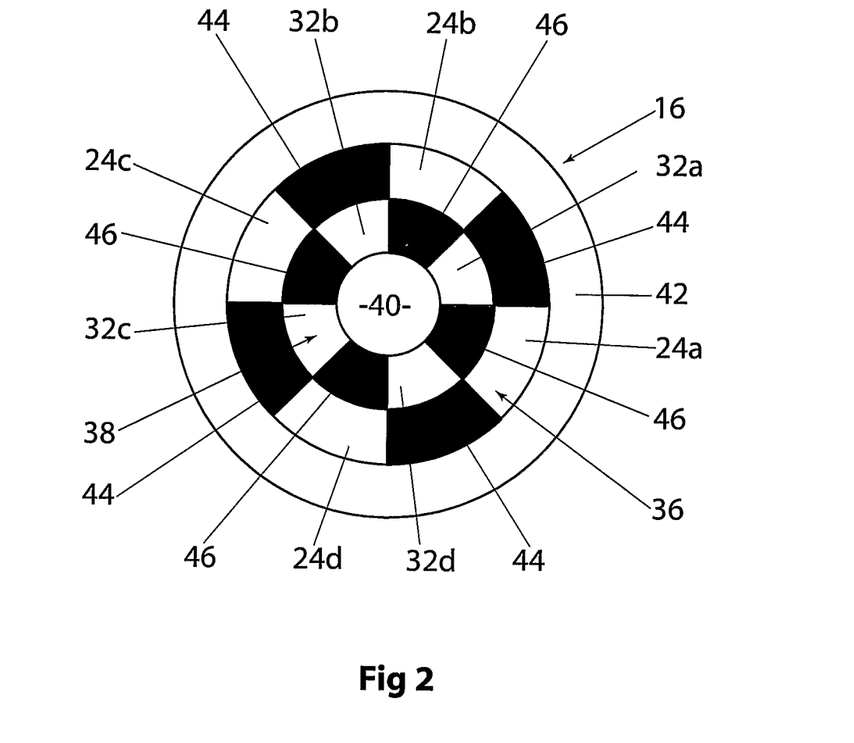
FIG. 2 is a schematic view taken along the line of I-I of FIG. 1 showing a cross-section through the extrusion die of the apparatus.

Referring to FIG. 2, which is a cross-section through the die assembly 16 taken upstream of the die outlet 28, it may be seen that the die assembly 16 comprises outer and inner flow path rings 36 and 38, defining the outer and inner flow path annulus 26 and 34, respectively, and mounted between an inner core 40 and a peripheral retaining cylinder 42.

As seen in FIG. 2, four melt pathways 24a, b, c and d are equally spaced around the outer flow path ring 36, with spacers 44 between them. Similarly, the inner flow path ring 38 has four equally spaced pathways 32a, b, c and d, separated by spacers 46. Each inner ring pathway 32 is radially aligned with a respective outer ring spacer 44, and each outer ring pathway 24 is radially aligned with a respective inner ring spacer 46 so that the outer ring pathways 32 alternate with the inner ring pathways 24 around the die assembly 16.

The melt pathways 24 and 32 are shown in FIG. 2 with an exaggerated radial dimension and fully radially offset. However, it will be appreciated from FIG. 1 that the outer and inner flow path rings 36 and 38 gradually merge radially so as to extend on a common radius adjacent the die outlet 28. Thus, by the time the two melts from the extruders 12 and 14 reach the die outlet 28 via the outer and inner melt pathways 24 and 32, the two melts have merged to form a continuous extruded tube 48 of alternating co-extruded bands of different compositions.

It will be recognised that the circumferential dimension of each of the melt pathways 24 and 32 may be adjusted as desired to provide different band widths in the extruded tube 48 of flexible polymeric sheet material, by changing the circumferential extent of the spacers 44 and 46. It will also be recognised that the apparatus 10 can be modified by including further extruders connected to the die assembly 16 through the intermediate transfer sub-assembly 18, and that each further extruder may be associated with a number of melt pathways in a respective flow path ring or may be connected to one or some of the melt pathways in the outer and inner flow path rings 36 and 38 instead of the first and second extruders 12 and 14. Ultimately, all melt pathways from all extruders must merge into a common annulus adjacent the die outlet 28 in order to form the continuous extruded tube 48 of flexible polymeric sheet material.

In accordance with the invention, the material compositions of the melts provided by at least two of the extruders must be different to provide one or more different physical properties or functions in the respective co-extruded bands of material in the tube 48.

After extrusion, the tube 48 is blown in known manner with a gas bubble between two sets of rollers (not shown) in order to orientate the material of the tube transversely. The material may also be oriented longitudinally by displacing the tube through the downstream set of rollers at a greater speed than through the first set of rollers. Other methods of orienting the polymeric sheet material are known, or the material may not be oriented at all.

Figure 3A:
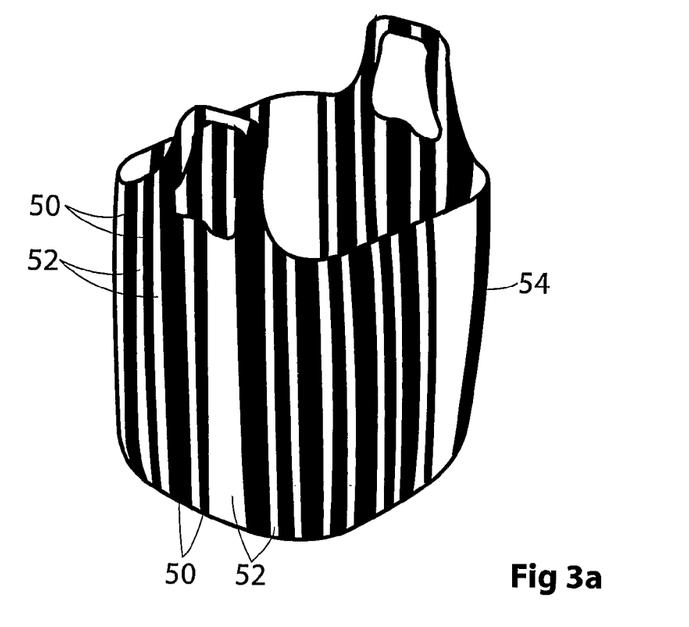
FIGS. 3a and b are perspective views of one form of a plastic bag formed from extruded flexible polymeric sheet material in accordance with the invention, with the sheet material extending longitudinally in the length or depth direction of the bag in FIG. 3a and in the transverse direction of the bag in FIG. 3b.
Figure 3B:
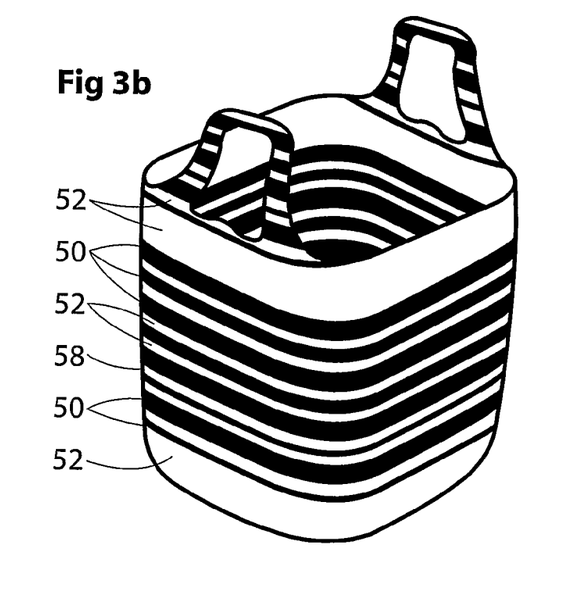
Figure 4A:
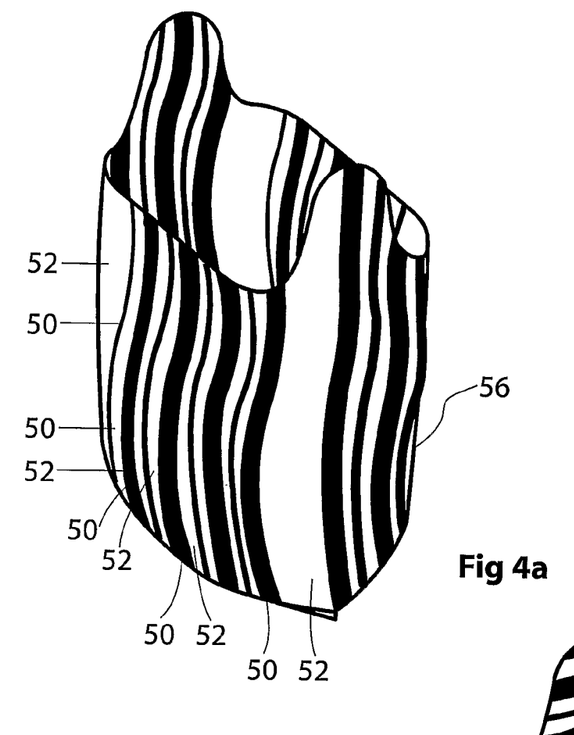
FIGS. 4a and b are perspective views of another form of a plastic bag formed from extruded flexible polymeric sheet material in accordance with the invention, with the sheet material extending longitudinally in the length or depth direction of the bag in FIG. 4a and in the transverse direction of the bag in FIG. 4b.
Figure 4B:
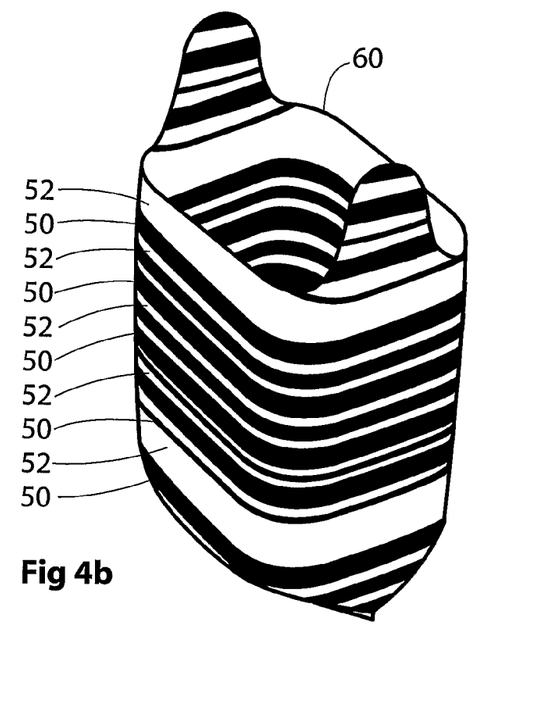

Two different forms of bag are shown in each of FIGS. 3 and 4, with the co-extruded bands having different material compositions represented by bands 50 and 52 of different shade. Thus, the bags in FIGS. 3 and 4 are illustrative of bags formed from sheet material extruded by the extrusion apparatus 10, but with a different number and spacing of the melt pathways 24 and 32.

In FIG. 3a, the bag 54 has the bands 50 and 52 extending longitudinally and may be made in one of two ways. Firstly, the extruded tube 48 shape may be maintained and the bags formed by cutting transversely across the tube and welding the bottom of the bag. Alternatively, the tube 48 may be slit longitudinally to form flat sheet material or film, which is then cut transversely at approximately twice the height of the bag. Each length of flat sheet material is then folded transversely to form a continuous bottom to the bag, and the sides are then welded. The handles may be formed during the cutting procedure or subsequently.

The same process may be used for the bag 56 in FIG. 4a, in which the handles differ.

In FIGS. 3b and 4b, the bags 58 and 60, respectively, have the co-extruded bands of different material composition extending transversely around the bags. The bags may be formed by slitting the tube 48 longitudinally, to form flat polymeric sheet material, cutting the flat sheet material to form lengths thereof, folding the lengths transversely, welding the two ends to form a tube and welding the two overlapping edges on one side to form the bottom.

For other products, the extruded tube 48 may be retained or slit longitudinally to form flat sheet material, depending upon the particular end product. In other apparatus, no tube is formed. Instead, a flat die is provided to produce flat extruded flexible polymeric sheet material.

It will be appreciated that the extruded flexible polymeric sheet material may contain bands with different additives, some bands with no additives to the base polymeric composition and some bands with additives, and/or some bands with different base polymeric compositions, with or without additives, depending upon the desired different physical properties or functions. Additionally, the bands may be coloured respectively, according to the extruder from which the particular material composition is derived. More than two extruders may be provided, all co-extruding into the common die, if it is desired to have more than two different sets of bands with different material compositions providing different functions or physical properties.

The following examples are to be understood as illustrative only. They should therefore not be construed as limiting the invention in any way.

EXAMPLES

Stretch Control

Example 1

For stretch control, one of the sets 50 and 52 of bands in the bags in FIGS. 3 and 4 can be made from an elastomeric material that is more elastic or stretchable than the material of the other set. This enables the bag to stretch in a transverse direction to the length of the bands and accordingly be more capacious so that it can be filled with more contents than an equivalent bag made from non-elastomeric material. For example, one set of bands can be made from LLDPE or EMA whilst the other is made from HDPE. Alternatively, the two sets of bands can contain blends of HDPE and LLDPE, but at different levels to provide the bands with more LLDPE with greater stretch properties. The level of stretching can be controlled not only by selecting the particular grade or proportion of more elastic material but also by selecting the width and numbers of the bands. The relatively non-stretching material of the other set of bands can maintain the integrity for the bag and provide a basic structure contributing strength and shape to the bag.

Metallocene-derived LLDPE is considerably more expensive than HDPE and other forms of LDPE, but has advantageous stretch properties. By restricting its use to one of the sets of bands it is economically possible to manufacture price-sensitive bags having improved stretch properties.

Example 2

A bag in accordance with FIG. 3 or FIG. 4 was made from co-extruded flexible polymeric sheet material in which a first of the sets 50 and 52 of bands has a composition of 80 wt % HDPE, 10 wt % LLDPE, 7 wt % colour pigments and 3 wt % odour control additives and the second set of bands has a composition of 50 wt % LLDPE, 40 wt % HDPE, 7 wt % colour pigments and 3 wt % odour control additives.

The second set of bands allow the bag to stretch in a controlled manner.

The colour pigments and odour control additives in the two sets of bands may be the same or different. Preferably, the colour pigments are different and one of the sets contains fragrance while the other set contains at least a malodour neutraliser.

Odour Control

Example 3

By the present invention, it is possible to make polymeric sheet material and products such as plastic bags therefrom having enhanced odour control properties. Thus, the two sets 50 and 51 of bands in the bags of FIGS. 3 and 4 may contain different fragrances or fragrance technologies. By keeping the two fragrances separate, the bag can emit two unique fragrances from adjacent bands rather than one distorted combined fragrance as a result of mixing the two fragrances into a single material composition.

Alternatively, one of the sets of bands can include an odour neutraliser, optionally with a different fragrance to the other set of bands. Alternatively again, one set of bands can include a bactericide or other anti-microbial agent, for example with one or more other odour control additive in the same and/or other set of bands.

Example 4

A bag in accordance with FIGS. 3 and 4 was made from co-extruded flexible polymeric sheet material in which a first of the sets 50 and 52 of bands has a composition of 92 wt % HDPE, 6 wt % orange colour pigment and 2 wt % IFF orange fragrance and the other set of bands has a composition of 92 wt % HDPE, 7 wt % lemon colour pigment and 1 wt % IFF odour neutraliser.

The bag effectively neutralised malodours in its contents while providing an orange fragrance and a pleasing orange/lemon colour combination.

Example 5

A bag in accordance with FIGS. 3 and 4 was made from co-extruded flexible polymeric sheet material in which a first of the sets 50 and 52 of bands has a composition of 92 wt % HDPE, 7 wt % white pigment and 1 wt % baking soda and the other set of bands had a composition of 97 wt % HDPE and 3 wt % blue tint.

The bag effectively neutralised malodours in its contents while providing a pleasing blue/white colour combination.

Example 6

A bag in accordance with FIGS. 3 and 4 was made from co-extruded flexible polymeric sheet material in which a first of the sets 50 and 52 of bands has a composition of 92 wt % HDPE, 7 wt % white pigment and 1 wt % baking soda and the other set of bands had a composition of 92 wt % HDPE, 6 wt % lemon colour pigment and 2 wt % lemon oil fragrance.

The bag effectively neutralised malodours in its contents while providing a lemon fragrance and a pleasing lemon/white colour combination.

Additionally, by keeping the baking soda and volitive lemon oil in separate bands, the possibility of a chemical reaction between them is alleviated. Such a reaction would product $CO_2$ with resultant bubbles in and weakening of the flexible polymeric sheet material.

Those skilled in the art will appreciate that the invention described herein is susceptible to variations and modifications other than those specifically described. It is to be understood that the invention includes all such variations and modifications which fall within its spirit and scope. The invention also includes all the steps, features, compositions and compounds referred to or indicated in this specification, individually or collectively, and any and all combinations of any two or more of said steps or features.

The reference to any prior art in this specification is not, and should not be taken as, an acknowledgment or any form of suggestion that that prior art forms part of the common general knowledge Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A plastic bag made from a sheet material including a plurality of bands of polymeric material extruded parallel to each other in a single layer film, wherein adjacent bands of polymeric material include odor control additives that are different from one another, and wherein adjacent bands of polymeric material include colorants to visually indicate the odor control additives.

2. A plastic bag made from a sheet material including a plurality of bands of polymeric material extruded parallel to each other in a single layer film, wherein adjacent bands of polymeric material include odor control additives that are different from one another.

3. A plastic bag according to claim 2, wherein the odor control additives are selected from an odor neutralizer, an odor absorber, a fragrance, and combinations thereof.

4. A plastic bag according to claim 3, wherein a first band includes a fragrance and a second band includes at least one of an odor absorber and an odor neutralizer.

5. A plastic bag according to claim 2, wherein the odor control additives are an odor neutralizer and a fragrance.

6. A plastic bag according to claim 2, wherein the odor control additives are different fragrances.

* * * * *